United States Patent [19]

Lee et al.

[11] Patent Number: 4,924,472
[45] Date of Patent: May 8, 1990

[54] LASER OUTPUT POWER STABILIZING APPARATUS OF A CONTINUOUS-WAVE GAS LASER DEVICE

[75] Inventors: In W. Lee; Dong J. Shin, both of Taejon, Rep. of Korea

[73] Assignee: Korea Standards Research Institute, Chungnam, Rep. of Korea

[21] Appl. No.: 241,661

[22] Filed: Sep. 8, 1988

[30] Foreign Application Priority Data

Jul. 13, 1988 [KR] Rep. of Korea ............... 1988-8693

[51] Int. Cl.⁵ .............................................. H01S 3/13
[52] U.S. Cl. ...................................... 372/29; 372/86; 372/33

[58] Field of Search ............... 372/87, 88, 83, 31.29, 372/86, 33

[56] References Cited

U.S. PATENT DOCUMENTS 4,509,176  4/1985  Marchetti et al. ............... 372/87
4,590,599  5/1986  Kawakubo et al. ............... 372/87

Primary Examiner—Leon Scott, Jr.
Attorney, Agent, or Firm—Armstrong, Nikaido, Marmelstein, Kubovcik & Murray

[57] ABSTRACT

A continuous-wave stabilizing apparatus wherein laser output power is stabilized by a feedback control of a voltage applied to an auxiliary electrode installed between an anode and a cathode depending on fluctuation of laser output power.

4 Claims, 2 Drawing Sheets

LASER OUTPUT POWER STABILIZING APPARATUS OF A CONTINUOUS-WAVE GAS LASER DEVICE

BACKGROUND OF THE INVENTION

1. Field of the Invention the present invention relates to an apparatus in which laser output power of a continuous-wave (CW) gas laser device is stabilized by the feedback control of discharge current with an auxiliary electrode in the gas discharge laser.

The gas discharge laser can be divided into such three parts as a resonator, a power supply and a laser (gas) medium and the fluctuation of laser output power is caused by the changes of the discharge condition, the gas condition and the resonator condition.

2. Description of the Related Art

In order to stabilize laser output power fluctuation, methods in which laser output power is stabilized by controlling the current of main power supply or, in the case of single mode laser, by controlling the length of resonator have been used so far. In order to stabilize the laser output power fluctuation, the current of the main discharge power source is controlled or, in the case of a single mode laser, the length of the resonator is controlled.

SUMMARY OF THE INVENTION

In the present invention, an apparatus is used in which laser output power is stabilized by the feedback control of the voltage applied to the auxiliary electrode installed between the anode and the cathode, depending on the fluctuation of laser output power.

In the present invention, laser output power is stabilized by operating the gas discharge laser in the current somewhat lower than the optimum current and by the feedback control of the voltage applied to the auxiliary electrode, depending on the fluctuation of laser output power.

The foregoing and other objects, features and advantages of this invention will be apparent from the following, more particularly, description of the preferred embodiments of this invention, as illustrated in the accompanying drawings.

DETAILED DESCRIPTION OF THE PREFERRED EMBODIMENT

Figure 1:
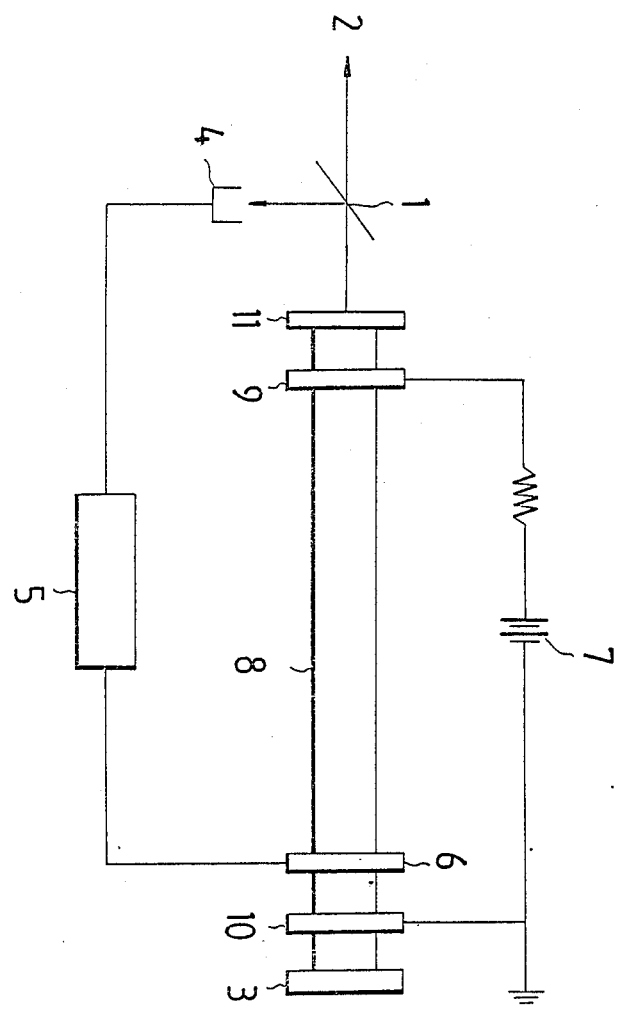
FIG. 1 shows the first embodiment of the present invention.
Figure 2:
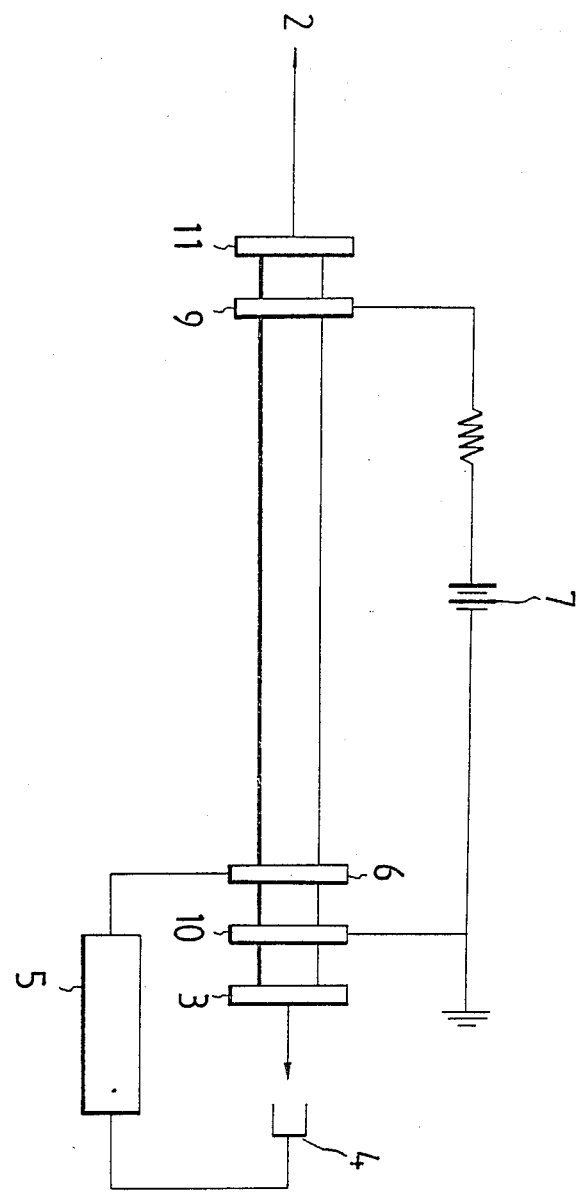
FIG. 2 shows the second embodiment of the present invention.

The laser output power stabilization apparatus and process is as shown in FIG. 1 and FIG. 2. The instant invention relates to an apparatus wherein laser output power of a CW gas laser device is stabilized by a feedback control (5) of a discharge current with an auxiliary electrode (6) in the gas discharge laser. The gas discharge laser can be divided into three parts, such as, a resonator, a power supply (7) and a laser (gas) medium (8), and the fluctuation of the laser output power is caused by the changes of the discharge condition, the gas condition, and the resonator condition, the gas condition, and the resonator condition. In the instant invention, the laser output power is stabilized by the feedback control (5) of a voltage applied to the auxiliary electrode (6) preferably installed between an anode (9) and a cathode (10), depending on the fluctuation of the laser output power.

More, particularly, the laser output power of the CW gas laser device is stabilized by separating a part of laser beam(2) with a beam splitter (1) (see, FIG. 1) or making a part of laser beam (2) penetrate the total reflector (3), (see FIG. 2) by measuring it with a photosensor (4) or measuring the fluctuation of laser output power as a change of impedance in the discharge tube, by inputting the measured signals to a feedback control circuitry (5) and by controlling the voltage applied to an auxiliary electrode (6), depending on the fluctuation of signals, namely, the fluctuation of laser output power.

The present invention contrived in a manner as described hereinabove is characterized by the fact that it is easy, safe and less expensive to manufacture a feedback control circuitry because the auxiliary electrode operates in the voltage and current much lower than the main discharge electrode and the fluctuation of laser output power is reduced to 1/10 of the fluctuation of unstabilized laser output power.

While the invention has been particularly shown and described in reference to preferred embodiments thereof, it will be understood by those skilled in the art that changes in form and details may be made therein without departing from the spirit and scope of the invention.

We claim:

1. A continuous-wave laser output power stabilizing apparatus, comprising:
    a power supply means for supplying power to said apparatus;
    a laser head means for generating a laser beam having a discharge tube, an auxiliary electrode and at least two reflectors, and further having an anode portion and cathode portion connected to said power supply means;
    a detector means for detecting laser output power fluctuations and for providing an output signal therefrom;
    a feedback control means for receiving said feedback signal from said detector means and for controlling voltage applied to said auxiliary electrode of said laser head means to thereby stabilize said laser output power fluctuations.

2. A continuous-wave laser output power stabilizing apparatus as in claim 1, further comprising a laser beam splitter means for splitting said laser beam, wherein a portion of said split beam is detected by said detecting means.

3. A continuous-wave laser output power stabilizing apparatus as in claim 1, wherein said portion of the laser beam is transmitted through at least one of said two reflectors of said laser head means and detected by said detector means.

4. A continuous-wave laser output power stabilizing apparatus as in claim 1, further comprising a means for measuring impedance variation in said laser discharge tube of said laser head means, wherein said measured impedance variation in said laser discharge tube is detected by said detector means.

* * * * *